United States Patent
Katsura et al.

(10) Patent No.: US 11,242,954 B2
(45) Date of Patent: Feb. 8, 2022

(54) NOZZLE-TYPE STEAM TRAP

(71) Applicant: ECO FIRST CO., LTD., Tokyo (JP)

(72) Inventors: Tsutomu Katsura, Tokyo (JP); Tomohiro Masutani, Tokyo (JP)

(73) Assignee: ECO FIRST CO., LTD., Tokyo (JP)

( * ) Notice: Subject to any disclaimer, the term of this patent is extended or adjusted under 35 U.S.C. 154(b) by 625 days.

(21) Appl. No.: 16/090,149

(22) PCT Filed: Apr. 4, 2017

(86) PCT No.: PCT/JP2017/014029
§ 371 (c)(1),
(2) Date: Mar. 25, 2019

(87) PCT Pub. No.: WO2017/175744
PCT Pub. Date: Oct. 12, 2017

(65) Prior Publication Data
US 2021/0003251 A1 Jan. 7, 2021

(30) Foreign Application Priority Data
Apr. 4, 2016 (JP) .............................. JP2016-075293

(51) Int. Cl.
*F16T 1/34* (2006.01)
*F16T 1/16* (2006.01)
*F16T 1/38* (2006.01)

(52) U.S. Cl.
CPC .................. *F16T 1/34* (2013.01); *F16T 1/16* (2013.01); *F16T 1/38* (2013.01); *F16T 1/386* (2013.01)

(58) Field of Classification Search
CPC ....... F16T 1/12; F16T 1/16; F16T 1/34; F16T 1/165; F16T 1/02; F16T 1/10; F16T 1/38;
(Continued)

(56) References Cited

U.S. PATENT DOCUMENTS 1,438,983 A * 12/1922 Collin .................... B01D 29/35
210/426
1,657,679 A * 1/1928 Knudstrup ................ F16T 1/24
137/165
(Continued)

FOREIGN PATENT DOCUMENTS

CA 2513060 A1 7/2004
CN 1735767 A 2/2006
(Continued)

OTHER PUBLICATIONS

Extended European Search Report dated Oct. 30, 2019 issued to European Patent Application No. EP 17779122.

*Primary Examiner* — Craig J Price
(74) *Attorney, Agent, or Firm* — Manatt, Phelps & Phillips, LLP

(57) ABSTRACT

A nozzle-type steam trap including a venturi nozzle, an orifice nozzle, or a tunnel structure resistance nozzle minimizes the outflow of steam even when a pressure difference between a drain-water inlet and a drain-water outlet of each nozzle fluctuates, the steam trap being compatible with any usage environments and enabling maintenance and inspection to be easily performed. The nozzle-type steam trap including the venturi nozzle, the orifice nozzle, or the tunnel structure resistance nozzle includes a means for sealing the nozzle by using a drain water. The nozzle-type steam trap further includes a plurality of steam inflow ports and drain-water outflow ports and includes a closure means for determining, for a selected one of the steam inflow ports and a selected one of the drain-water outflow ports, passages of steam and drain water. More preferably, the steam trap includes a swirl flow formation means in the vicinity of the nozzle.

8 Claims, 7 Drawing Sheets

(58) Field of Classification Search
CPC ..... F16T 1/386; F16T 1/40; F16T 1/42; F16T 1/45; B01D 35/02; B01D 39/12; B01D 39/16; B01D 39/20; B01D 46/4272; B01D 46/4281; B01D 46/4227; B01D 45/04; B01D 45/12; Y10T 137/3003; Y10T 137/3021; Y10T 137/304; Y10T 137/794; Y10T 137/7976; Y10T 137/8013; Y10T 137/8049; Y10T 137/8085; Y10T 137/3006; Y10T 137/3024; F16L 55/07
USPC ....... 137/171, 177, 183, 544, 545, 546, 547, 137/549; 256/56–59, 94, 43, 93 R, 256/101 B; 55/466
See application file for complete search history.

(56) References Cited

U.S. PATENT DOCUMENTS

| | | | | |
|---|---|---|---|---|
| 1,950,227 | A * | 3/1934 | Chevalier | F16T 1/34 137/177 |
| 2,020,563 | A * | 11/1935 | Moore | F16T 1/34 137/177 |
| 2,051,732 | A | 8/1936 | McKee | |
| 2,449,055 | A * | 9/1948 | Carson | F24D 19/081 237/68 |
| 2,636,506 | A * | 4/1953 | St Clair | F16L 55/07 137/177 |
| 3,302,878 | A * | 2/1967 | Fujiwara | F16T 1/10 236/56 |
| 3,351,281 | A * | 11/1967 | Keil | F16T 1/24 236/56 |
| 3,893,473 | A * | 7/1975 | Breece | F16T 1/34 137/171 |
| 4,745,943 | A | 5/1988 | Mortensen | |
| 4,867,767 | A | 9/1989 | Yokoyama | |
| 5,429,150 | A | 7/1995 | Siefers, Jr. | |
| 5,628,339 | A | 5/1997 | Isringhausen | |
| 5,948,128 | A | 9/1999 | Stavropoulos et al. | |
| 2006/0108013 | A1 | 5/2006 | Carmichael | |
| 2016/0146399 | A1 | 5/2016 | Katsura | |

FOREIGN PATENT DOCUMENTS

| | | |
|---|---|---|
| CN | 204879420 U | 12/2015 |
| CN | 105518373 A | 4/2016 |
| EP | 3029368 A1 | 6/2016 |
| ES | 2306978 T3 | 11/2008 |
| GB | 432033 A | 7/1935 |
| GB | 2397032 A | 7/2004 |
| JP | 3354398 B2 | 12/2002 |
| JP | 2004-162866 A | 6/2004 |
| JP | 2004-190827 A | 7/2004 |
| JP | 2006-515050 A | 5/2006 |
| JP | 2008-309290 A | 12/2008 |
| JP | 3194719 U | 12/2014 |
| JP | 2016-080002 A | 5/2016 |
| KR | 1992-0008197 B1 | 9/1992 |
| KR | 10-2006-0031593 A | 4/2006 |
| KR | 10-2016-0038897 A | 4/2016 |
| WO | 2004/063620 A1 | 7/2004 |
| WO | 2014/025246 A1 | 2/2014 |
| WO | 2015/016298 A1 | 2/2015 |

* cited by examiner

NOZZLE-TYPE STEAM TRAP

CROSS REFERENCE TO RELATED APPLICATIONS

This application is a national stage application under 35 U.S.C. 371 of PCT Application No. PCT/JP2017/014029, filed on Apr. 4, 2017, which claims priority to JP Application No. 2016-075293, filed on Apr. 4, 2016. All of the above applications are incorporated herein by reference.

TECHNICAL FIELD

The present invention relates to a nozzle-type steam trap that automatically and continuously drains a drain water (condensed water formed by condensed steam) generated in steam-using facilities and a steam transport piping system between these facilities to the outside of the system in various factories, plants, or the like in which steam is used as a heating source via a heat exchanger, and particularly relates to a nozzle-type steam trap that includes a venturi nozzle, an orifice nozzle, or a tunnel structure resistance nozzle.

BACKGROUND ART

A large number of steam traps are used in various factories, plants, and the like in which steam is used as a heating source via a heat exchanger to automatically drain a drain water generated in steam-using facilities and a steam transport piping system between these facilities to the outside of the system.

The use of steam traps in large numbers is to ensure appropriate temperature conditions in, first of all, steam-using facilities, such as a heat exchanging unit of a dryer and a heating furnace, and in steam transport pipes that connect these facilities to each other. For example, when a drain water remains inside steam-using facilities or inside a steam transport piping system, heating efficiency is decreased, productivity of the facilities is considerably decreased, and uneven heating due to drain drops may lead to inferior quality of products, which impedes stable operation of factories. Moreover, such a drain water may cause extremely dangerous steam hammer in which a drain water remaining in a steam piping system agglomerates while flowing by being pushed by steam and a large agglomerate of the drain water collides with a bending portion of a pipe or a valve or steam hammer in which a drain water remaining in a steam piping system comes into contact with steam, the steam is thereby immediately condensed to have a zero volume and locally produces a vacuum state, and a surge of the drain water collides with a portion in the vacuum state, which may hinder safe operation of factories.

Typically, a mechanical engineering-based mechanical steam trap (bucket type or float type), a thermostatic steam trap (bimetallic type or bellow type), a thermodynamic steam trap (disc type), and the like are used.

These steam traps that include movable portions are fundamentally drainage valve mechanisms that exploit physical phenomena such as buoyancy difference, temperature difference, and the like to open and close valves. Each drainage valve mechanism repeats an operation in which, when a certain amount of a drain water is stored, a drainage valve is opened to drain the drain water and closed immediately after the drainage. Thus, delay in operations and damage of movable portions as a result of repeated operations easily occur. Moreover, it is difficult to suppress a large amount of steam leakage, and steam is thus significantly wasted. In addition, the intermittent drainage in the steam traps that have the movable portions does not ensure the stable operation of steam-using facilities. Such problems of existing mechanical engineering-based steam traps are notable, and solutions to the problems have been desired in recent years from the point of view of, in particular, global environment protection, such as an increase in efficiency, an energy saving, a reduction in $CO_2$, and the like in factories.

Accordingly, interest in steam traps of a venturi nozzle type, an orifice nozzle type, and a tunnel structure resistance nozzle type has increased. These steam traps are called hydraulic engineering-based steam traps and exploit properties of water in which kinetic viscosity is lower than that of steam to pass through a narrow passage and fluidity is approximately 30 times the fluidity of steam. FIG. 1 illustrates, as a typical example, a venturi nozzle-type steam trap described in U.S. Pat. No. 5,429,150. As clearly illustrated, a venturi nozzle 9 includes a venturi tube 10 disposed between a drain-water inlet passage 11 and a drain-water outlet passage 12. When the venturi tube 10 having an ideal bore diameter that is adjusted such that 50% or more of a drain water, which is liquid, is drained with a certain pressure difference applied to the venturi tube 10 is selected, the venturi tube 10 is sealed by the drain water, and only the drain water is drained while steam does not flow out. Since steam traps of the orifice nozzle type, the venturi nozzle type, and the tunnel structure resistance nozzle type each have a small-diameter tube-shaped bore and a hydraulic engineering-based structure having no movable portion such as a drainage valve, continuous drain-water drainage in which steam leaking is minimized is achieved, unlike in the aforementioned existing steam traps having movable portions, and the fuel consumption of a boiler is greatly reduced. Moreover, the structure having no movable portion has excellent durability and has a feature in which maintenance and inspection are easily performed. Further, the structure having no movable portion also has excellent stability and security as a result of having strong durability against steam hammer and freezing.

Accordingly, a large number of improvement ideas relating to steam traps of the orifice nozzle type and the venturi nozzle type and a steam trap of a tunnel structure resistance tube type are disclosed. In addition to U.S. Pat. No. 5,429,150 presented above, such improvement ideas of steam traps are disclosed in, for example, Japanese Unexamined Patent Application Publication Nos. 2004-162866, 2004-190827, and 2008-309290 and U.S. Pat. Nos. 4,745,943, 5,628,339, and 5,948,128. Each of these steam traps is provided with a drainage valve function in which only preferentially drainage of a drain water is used to seal each small-diameter tube-shaped bore.

The drainage valve function in which a small-diameter tube-shaped bore is sealed by preferentially draining a drain water is, however, insufficient and causes the following problems. For example, only when the pressure difference applied to the venturi tube 10 disposed between the drain-water inlet passage 11 and the drain-water outlet passage 12 is stable, the venturi nozzle 9 properly exerts the drainage valve function. However, fluctuation in steam pressure is actually large, and in particular, when an amount of the drain water is small or when an amount of generated drain water is suddenly increased or decreased due to warm air in an emergency, a high-pressure water injector of a desuperheater, or the like, it is not possible for the venturi tube 10 having a fixed bore diameter to follow such a sudden increase or decrease, leading to a problem in which steam passes through the venturi tube 10 and the drainage valve function is not exerted. In such a circumstance, steam is wasted, and an increase in efficiency, an energy saving, and a reduction in $CO_2$ in factories, which are required for existing steam traps, are failed to be achieved.

In addition, there is another problem in which mass production is not possible because, similarly to, for example, a steam transport pipe 7 and a drain-water drainage pipe 8 in FIG. 1, a steam inlet and a drain-water outlet of a nozzle-type steam trap are disposed on substantially identical axes or fixed at predetermined positions and it is thus necessary to order to produce various types of steam traps in accordance with various usage environments in factories, plants, or the like in which steam is used as a heating source via a heat exchanger. Such a circumstance makes it difficult for steam traps used in large numbers in various factories, facilities, or the like to improve productivity and to reduce costs.

In addition, orifice nozzles, venturi nozzles, and tunnel structure resistance nozzles all have a problem in which a small-diameter tube-shaped bore becomes clogged with rust, dust, and the like that flow in from a steam transport system and that are small enough to pass through a screen. As a result, the replacement frequency of each nozzle is increased, which increases loads of maintenance and inspection.

CITATION LIST

Patent Literature

PTL 1: U.S. Pat. No. 5,429,150
PTL 2: Japanese Unexamined Patent Application Publication No. 2004-162866
PTL 3: Japanese Unexamined Patent Application Publication No. 2004-190827
PTL 4: Japanese Unexamined Patent Application Publication No. 2008-309290
PTL 5: U.S. Pat. No. 4,745,943
PTL 6: U.S. Pat. No. 5,628,339
PTL 7: U.S. Pat. No. 5,948,128

SUMMARY OF INVENTION

Technical Problem

To address the aforementioned problems, the present invention provides a nozzle-type steam trap including a venturi nozzle, an orifice nozzle, or a tunnel structure resistance nozzle, the nozzle-type steam trap reducing a waste of steam due to fluctuation and the like of a pressure difference between a drain-water inlet and a drain-water outlet, and also provides a nozzle-type steam trap compatible with any usage environments of the steam trap and capable of improving productivity and reducing costs. Moreover, the present invention also provides a nozzle-type steam trap that suppresses clogging of a nozzle and minimizes loads of maintenance and inspection.

Solution to Problem

To address the waste of steam, which is a problem of the aforementioned existing technology, the present invention provides a nozzle-type steam trap that causes steam flowing in from a steam transport pipe to flow through a venturi nozzle, an orifice nozzle, or a tunnel structure resistance nozzle and that drains a drain water from a drain-water drainage channel, the nozzle-type steam trap including a nozzle sealing means on a drain-water drainage side of the nozzle that has a small-diameter tube-shaped bore through which the drain water is drained, the nozzle sealing means sealing the bore by using the drain water. More specifically, in the nozzle-type steam trap, a drain-water storage portion that includes the nozzle and an intra-drain system drainage port connected to an extra-drain system drainage port through which the drain water is drained to an outside of a system of the steam trap is disposed as the nozzle sealing means, the intra-drain system drainage port being disposed at a portion above the nozzle.

In the nozzle-type steam trap according to the present invention, to address compatibility with various usage environments, an improvement in productivity, and a reduction in costs, which are problems of the aforementioned existing technologies, the steam transport channel connected to a steam inflow side of the steam trap and the drain-water drainage channel connected to a drain-water drainage side of the steam trap are not on an identical axis. Moreover, in the nozzle-type steam trap according to the present invention, the steam transport channel includes a plurality of steam transport channels through which the steam flows into the system of the steam trap, the drain-water drainage channel includes a plurality of drain-water drainage channels through which the drain water is drained to the outside of the system of the steam strap from the extra-drain system drainage port, and a means for closing a selected one of the steam transport channels and a selected one of the drain-water drainage channels is provided, the means being capable of determining passages for the steam and the drain water. For example, a plurality of freely closable means may be provided in a steam passage extending from the steam transport channels to the nozzle and in a drain-water passage extending from the extra-drain system drainage port to the drain-water drainage channels. A cock, a valve, a tap, a plug, a screw, or the like is usable as such a closable means; however, the closable means is not particularly limited.

In the nozzle-type steam trap according to the present invention, to reduce loads of maintenance and inspection, a swirl flow formation means that causes steam transported from the steam transport channel to generate a swirl flow is preferably disposed in a vicinity of a drain-water inlet of the nozzle of the steam passage extending from the steam transport channels to the nozzle.

Advantageous Effects of Invention

According to the present invention, a nozzle-type steam trap including an orifice nozzle, a venturi nozzle, or a tunnel structure resistance nozzle sufficiently exerts a drainage valve function because, even when a pressure difference between a drain-water inlet side and a drain-water outlet side of each small-diameter tube-shaped bore fluctuates, a drain water seals the small-diameter tube-shaped bore and the steam is thus suppressed from passing through the small-diameter tube-shaped bore. Consequently, it is possible to achieve increased efficiency, energy savings, a reduction in $CO_2$, and the like in factories without wasting steam.

Moreover, according to the present invention, the steam trap is compatible with various usage environments in factories, plants, and the like because the steam transport channel and the drain-water drainage channel of the steam trap are not on an identical axis.

In the nozzle-type steam trap according to the present invention, the steam transport channel includes a plurality of steam transport channels through which the steam flows into the system of the steam trap, the drain-water drainage channel includes a plurality of drain-water drainage channels through which the drain water is drained to the outside of the system of the steam trap from the extra-drain system drainage port, and the means for closing a selected one of the steam transport channels and a selected one of the drain-water drainage channels is provided to thereby determine passages for the steam and the drain water. Consequently, it is possible to introduce the nozzle-type steam trap according to the present invention to a steam transport system and a drain-water drainage system in any circumstances and to achieve an improvement in productivity and a reduction in costs of the steam trap because it is not necessary to order to produce various types of steam traps in accordance with various usage environments in factories, plants, or the like.

In addition, since the nozzle-type steam trap according to the present invention includes a means with which steam of a swirl flow is injected into the small-diameter tube-shaped bore, it is possible to suppress the nozzle from being clogged with rust, dust, and the like that flow in from the steam transport channel, which minimizes the replacement frequency of the nozzle. Consequently, it is possible to reduce loads of maintenance and inspection of the steam trap.

DESCRIPTION OF EMBODIMENTS

Hereinafter, regarding embodiments of the present invention, a venturi nozzle-type steam trap will be described, as a typical example, with reference to the drawings; however, the present invention is also applicable to general nozzle-type steam traps of the orifice nozzle type and the tunnel structure resistance nozzle type capable of performing continuous drainage. Note that the present invention is not limited to these embodiments, can be carried out by being variously modified within a scope not deviating from the spirit of the present invention, and is limited by only the technical concept disclosed in the claims.

Figure 1:
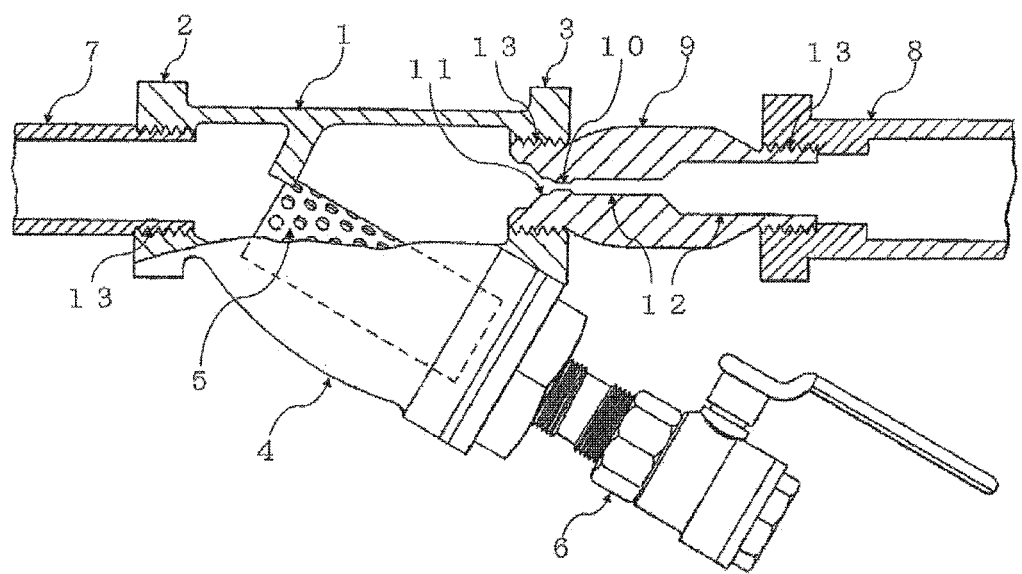
FIG. 1 is a schematic view illustrating a section of an existing venturi nozzle-type steam trap.
Figure 2:
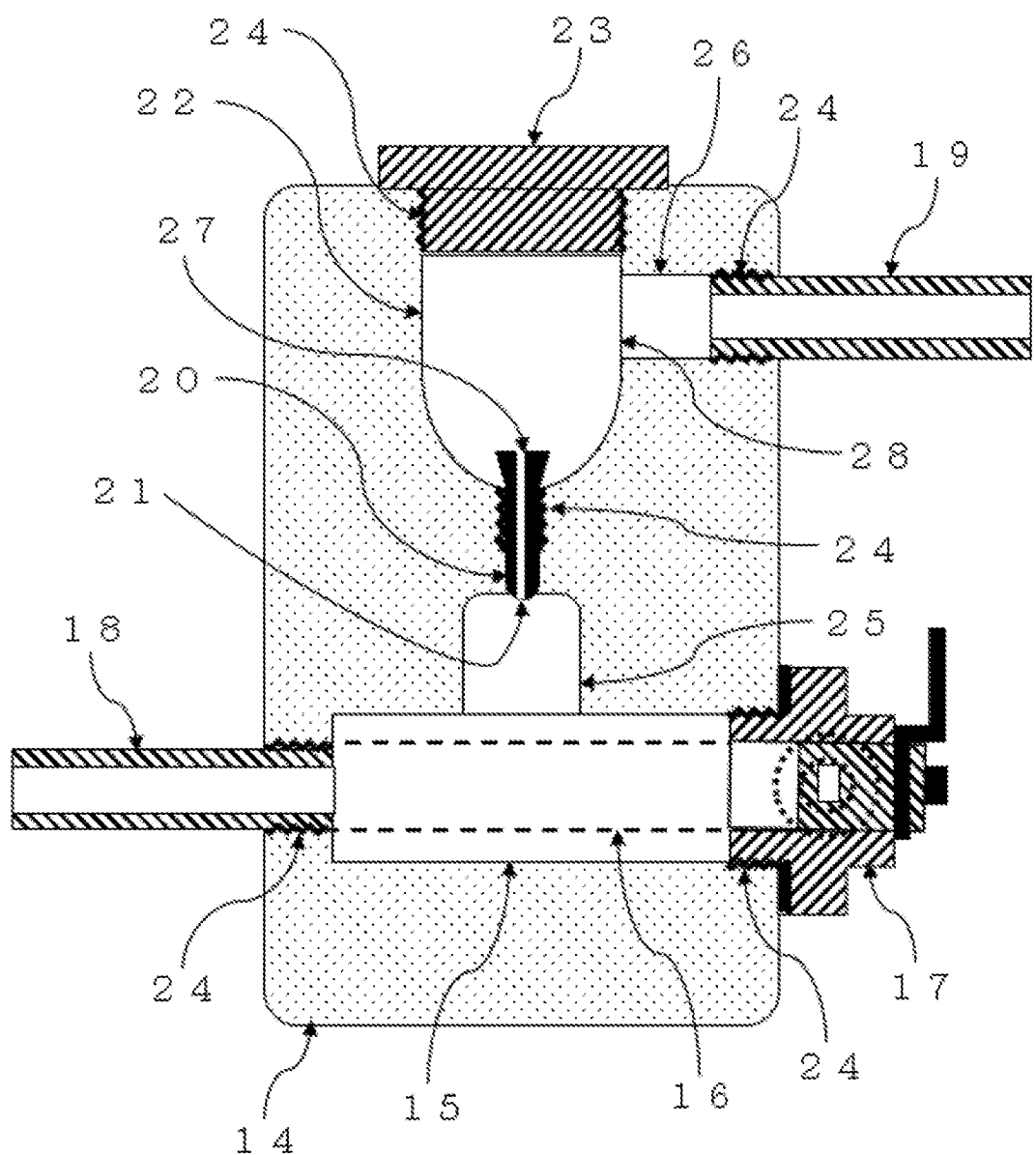
FIG. 2 is a schematic view illustrating a section of a horizontal strainer-included venturi nozzle-type steam trap according to an embodiment of the present invention, in which a means for sealing a venturi tube by using a drain water is provided and a steam transport pipe and a drain-water drainage pipe are not on an identical axis.

FIG. 2 is a schematic view illustrating a section of a horizontal strainer-included venturi nozzle-type steam trap according to an embodiment of the present invention, in which a means for sealing a venturi tube by using a drain water is provided, and a steam transport pipe and a drain-water drainage pipe are not on an identical axis.

A steam trap body 14 according to the present invention is manufactured by a general casting method, a general cutting method, or the like for stainless steel so as to include at least opening portions to which a steam transport pipe 18 and a drain-water drainage pipe 19 are connected, a strainer 15, a feeding portion of a venturi nozzle 20, a drain-water storage tank 22, a steam passage 25 (including passages in an inner portion of the strainer 15; the same applies to the following), and a drain-water passage 26. The venturi nozzle-type steam trap according to the present invention functions when the steam transport pipe 18 constituting a steam transport system and the drain-water drainage pipe 19 constituting a drain-water drainage system are connected to the steam trap body 14, a screen 16 for filtering rust and dust, a drainage valve 17 for maintenance, inspection, and the like of the strainer, and the venturi nozzle 20 are installed, and the drain-water storage tank is sealed with a cap 23.

Steam that flows in from the steam transport pipe 18 passes through the screen 16 installed in the inner portion of the strainer 15, and goes into the steam passage 25. The venturi nozzle 20 includes a venturi tube 21 having an ideal bore diameter that is adjusted such that 50% or more of a drain water, which is a condensed water formed by condensed steam, is drained with a certain pressure difference applied to the venturi tube 21, which is a tube-shaped bore. Therefore, the venturi tube 21 is closed by the drain water, and only the drain water is drained while the steam in the steam passage 25 does not flow out. Here, the drain-water storage tank 22 according to the present invention is designed such that the drain-water passage 26 through which the drain water is drained is disposed at a portion above the venturi nozzle 20. In other words, the drain-water storage tank 22 in which an extra-drain system drainage port 28 is positioned higher than an intra-drain system drainage port 27 serves as a nozzle sealing means for storing the drain water and sealing the nozzle by using the drain water. Since the nozzle sealing means seals the venturi tube 21, steam does not pass through the venturi tube 21 even when the pressure difference between an inlet side and an outlet side of the venturi nozzle 20 fluctuates. Consequently, a drainage valve function is sufficiently exerted.

As an example of a connection and installation method for fixing each component, a screw-type connection in which a screw thread 24 is provided on each component is presented; however, the connection and installation method is not particularly limited. In addition, as a material for each component constituting the steam trap, stainless steel, which does not easily deteriorate, is generally used; however, gunmetal, brass, cast iron, or the like is usable as the material. In particular, when the environment of facilities is poor and it is necessary to consider corrosion resistance, austenitic stainless steel (for example, SUS304, SUS316, etc.) or austenitic-ferritic stainless steel (for example, SUS329J3L, SUS329J4L, SAF2507, SAF2707HD, DP28W, etc.), which is excellent in terms of corrosion resistance, is preferably used. Due to the need to select in consideration of workability and costs, SUS304, SUS316, SUS329J3L, and SUS329J4L are particularly suitable. Regarding such materials of each component, the same applies to the following.

Figure 3:
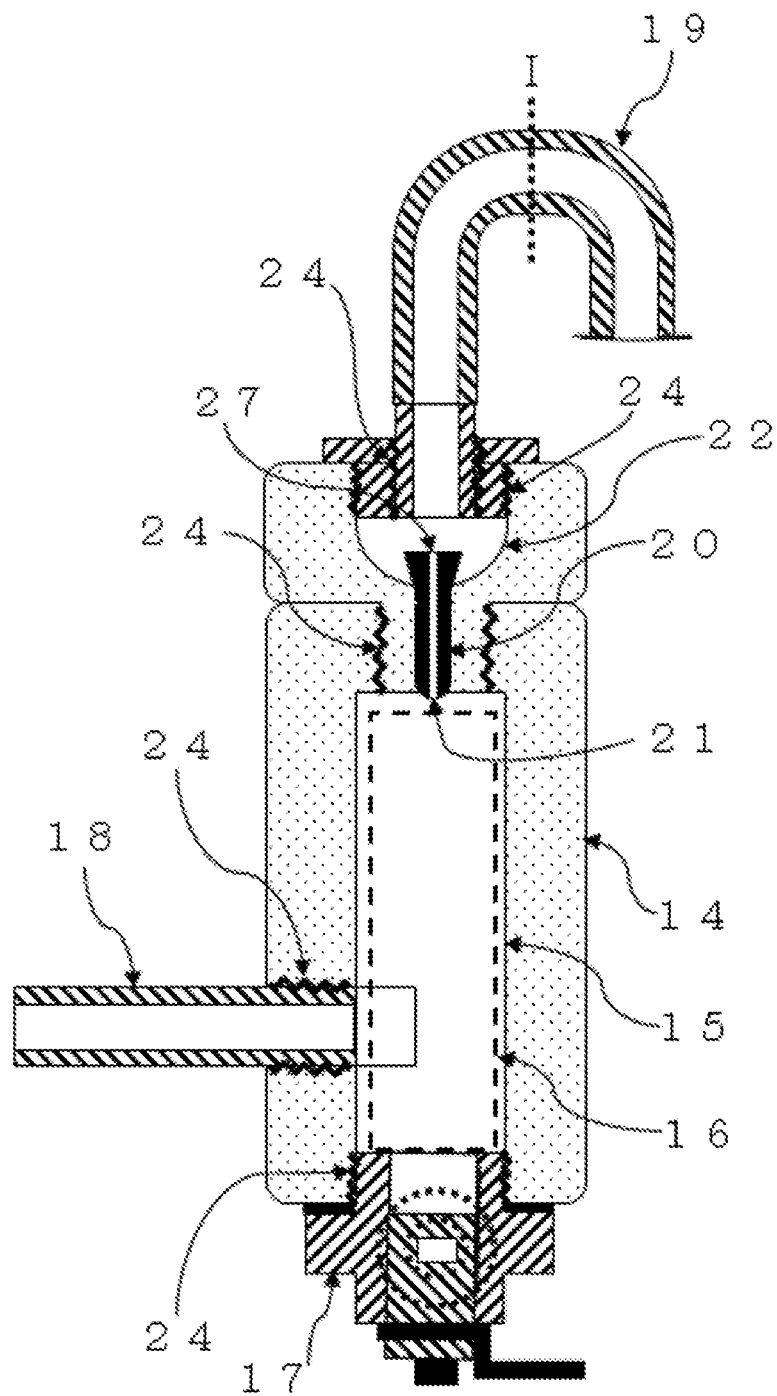
FIG. 3 is a schematic view illustrating a section of a vertical strainer-included venturi nozzle-type steam trap according to an embodiment of the present invention, in which the steam transport pipe and the drain-water drainage pipe not on an identical axis are perpendicular to each other in terms of the positional relationship and an extra-drain system drainage port I is variable.

FIG. 3 is a schematic view illustrating a section of a vertical strainer-included venturi nozzle-type steam trap according to an embodiment of the present invention, in which the steam transport pipe and the drain-water drainage pipe not on an identical axis are perpendicular to each other in terms of the positional relationship and an extra-drain system drainage port I is variable. The basic structure of the venturi nozzle-type steam trap is identical to that in FIG. 2. The venturi nozzle-type steam trap is characterized by the steam transport pipe 18 and the drain-water drainage pipe 19 that are disposed perpendicular to each other. Moreover, the venturi nozzle-type steam trap is characterized by including the drain-water storage tank 22, which is the nozzle sealing means for storing the drain water and sealing the nozzle by using the drain water, and by being capable of freely controlling the height of the extra-drain system drainage port I by deforming the drain-water drainage pipe 19 and being capable of greatly varying the pressure difference to be applied to the venturi tube 21. Accordingly, the venturi nozzle-type steam trap is compatible with various operational conditions of plants or factories and various conditions of natural environment.

Figure 4:
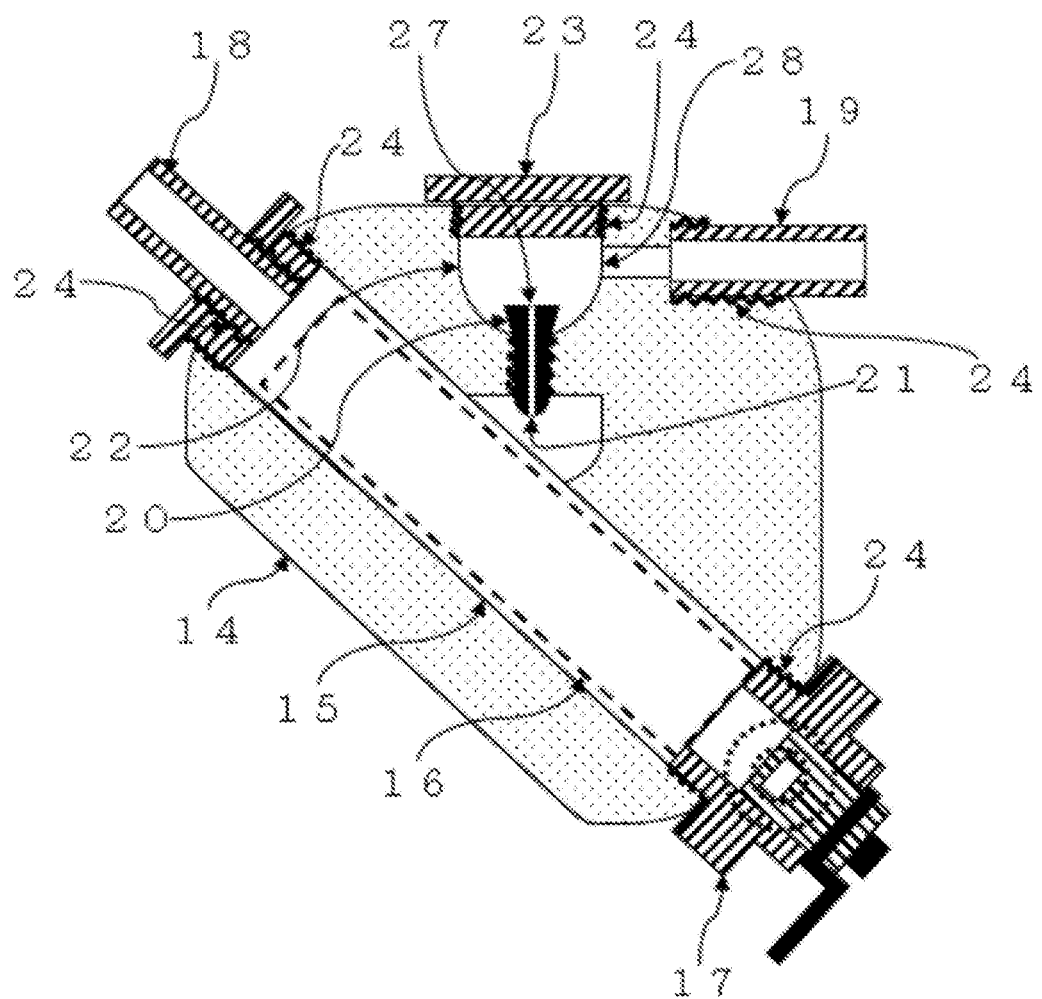
FIG. 4 is a schematic view illustrating a section of a Y-shaped strainer-included venturi nozzle-type steam trap according to an embodiment of the present invention, in which the steam transport pipe and the drain-water drainage pipe not on an identical axis are at an angle approximately 45 degrees to each other in terms of the positional relationship.

FIG. 4 is a schematic view illustrating a section of a Y-shaped strainer-included venturi nozzle-type steam trap according to an embodiment of the present invention, in which the steam transport pipe 18 and the drain-water drainage pipe 19 not on an identical axis are at an angle approximately 45 degrees to each other in terms of the positional relationship. The basic structure of the venturi nozzle-type steam trap is identical to that in FIG. 2. The venturi nozzle-type steam trap is characterized by the steam transport pipe 18 and the drain-water drainage pipe 19 that are disposed at approximately 45 degrees to each other. The venturi nozzle-type steam trap is obtained by increasing piping flexibility in an existing Y-type strainer-included steam trap.

Figure 5:
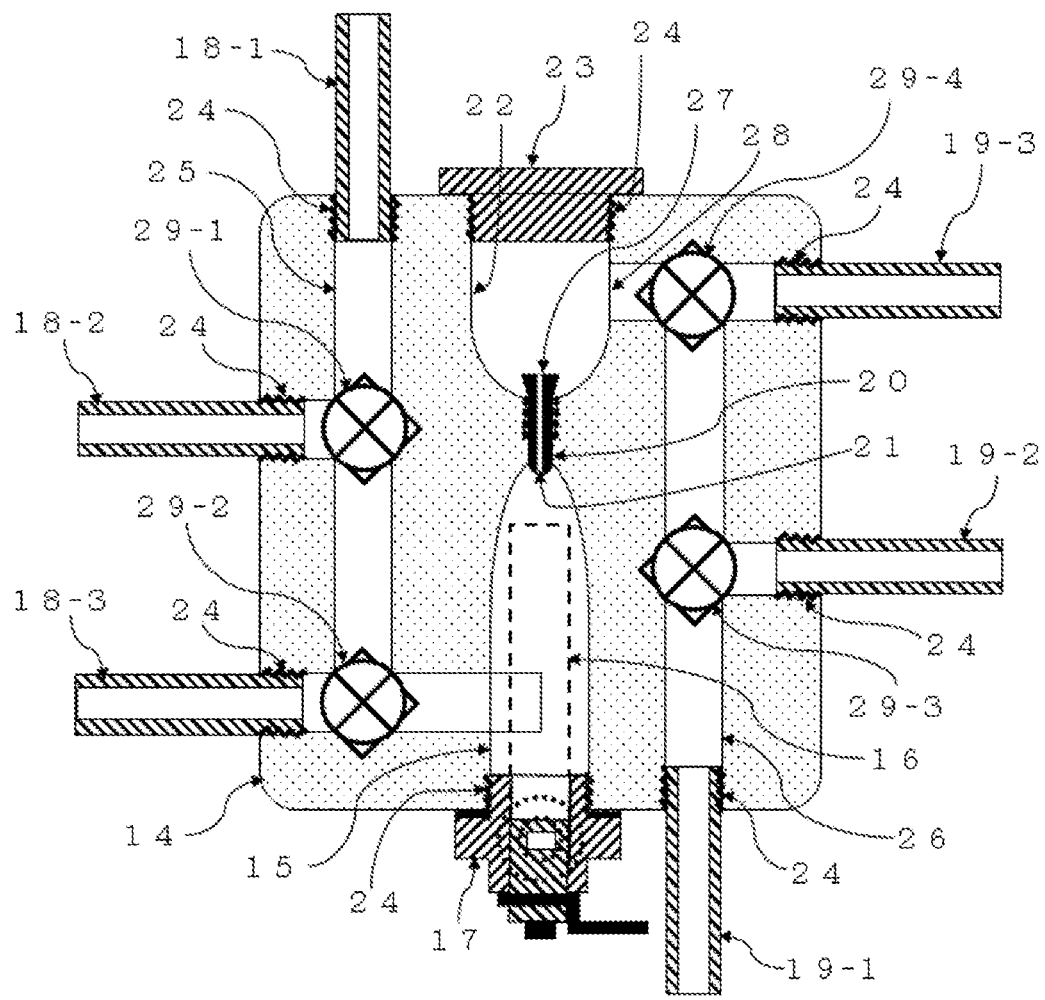
FIG. 5 is a schematic view of a section of a venturi nozzle-type steam trap according to an embodiment of the present invention, in which a means for sealing the venturi tube by using the drain water is provided, the steam transport pipe includes a plurality of steam transport pipes through which steam flows into a steam trap system, the drain-water drainage pipe includes a plurality of drain-water drainage pipes through which the drain water is drained to an outside of the steam trap system from the extra-drain system drainage port, and a plurality of freely openable and closable cocks is provided in a steam passage extending from the steam transport pipes to the nozzle and in a drain-water passage extending from the extra-drain system drainage port to the drain-water drainage pipes.

FIG. 5 is a schematic view of a section of a venturi nozzle-type steam trap according to an embodiment of the present invention, compatible with any usage environments. In the venturi nozzle-type steam trap, the drain-water storage tank 22 is provided as a means for sealing the venturi tube 21 by using the drain water, a plurality of steam transport pipes 18-1 to 18-3 through which steam flows into a steam trap system and a plurality of the drain-water drainage pipes 19-1 to 19-3 through which the drain water is drained to the outside of the steam trap system via the extra-drain system drainage port 28 are provided, and a plurality of freely openable and closable three-way cocks 29-1 to 29-3 are disposed in the steam passage 25 extending from the steam transport pipes 18-1 to 18-3 to the nozzle and in the drain-water passage 26 extending from the extra-drain system drainage port 28 to the drain-water drainage pipes 19-1 to 19-3. Note that the nozzle sealing means of the drain-water storage tank 22 is as described with reference to FIG. 2, and description thereof is omitted.

More specifically, the steam trap body 14 is manufactured by a general casting method for stainless steel so as to include the strainer 15, the feeding portion of the venturi nozzle 20, and the drain-water storage tank 22 and so as to include three opening portions to which the steam transport pipes 18-1 to 18-3 are connected, the steam passage 25 with which these opening portions and the strainer 15 communicate, three opening portions to which the drain-water drainage pipes 19-1 to 19-3 are connected, and the drain-water passage 26 with which the opening portions and the drain-water storage tank communicate. The three-way cocks 29-1 to 29-4 are disposed such that only any one of the steam transport pipes 18-1 to 18-3 communicates with the strainer and only any one of the drain-water drainage pipes 19-1 to 19-3 communicates with the drain-water storage tank 22. While no illustration is provided, it is possible to easily carry out a method of freely selecting channels of the steam and the drain water by inserting plugs, instead of the plurality of openable and closable cocks in FIG. 5, into the steam passage 25 and the drain-water passage 26 that are not in use to select an inlet (opening portion to which the steam transport pipe is connected) of the steam and an outlet (opening portion to which the drain-water drainage pipe is connected) of the drain water.

Thus, since connection of the steam transport pipes 18-1 to 18-3 and the drain-water drainage pipes 19-1 to 19-3 is enabled, it is possible to introduce the nozzle-type steam trap according to the present invention between a steam transport channel and a drain-water transport channel of various factories or plants. Accordingly, the nozzle-type steam trap according to the present invention is considered a steam trap compatible with all usage environments. As a matter of course, while an example in which the three opening portions to which the steam transport pipes are connected and the three opening portions to which the drain-water drainage pipes are connected are disposed is presented, the number of the opening portions is not particularly limited. Moreover, the number of the opening portions to which the steam transport pipes are connected and the number of the opening portions to which the drain-water drainage pipes are connected do not necessarily coincide with each other.

The nozzle-type steam trap above, however, has an inconvenience in which due to the small bore diameter of the venturi tube 21 of the venturi nozzle 20, the venturi nozzle 20 becomes clogged with rust and dust that are contained in steam flowing in from the steam transport channels and that are not filtered by the screen 16. Therefore, the nozzle-type steam trap according to the present invention includes a swirl flow formation means disposed in the vicinity of a drain-water inlet of the venturi nozzle.

Figure 6A:
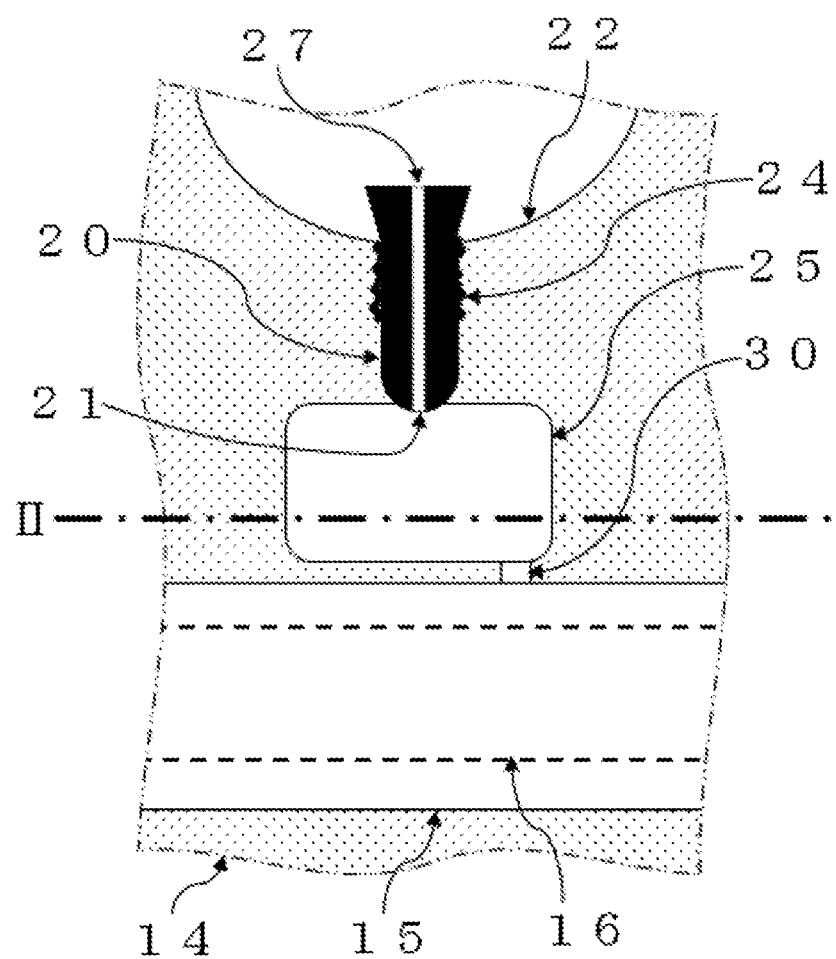
FIG. 6A is a schematic view of a section of a venturi nozzle-type steam trap according to an embodiment of the present invention, in which the means for sealing the venturi tube by using the drain water is provided and a swirl flow formation passage capable of causing a swirl flow is disposed in the vicinity of a drain-water inlet of the venturi tube in the steam passage.
Figure 6B:
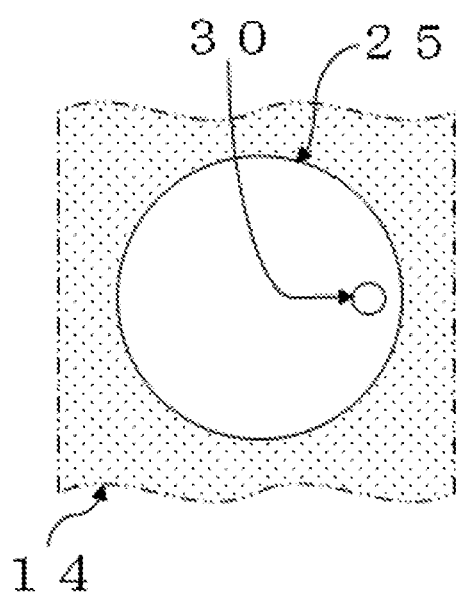
FIG. 6B is a schematic view illustrating a section taken along a section line II in FIG. 6A.

FIG. 6A and FIG. 6B are schematic views of a structure in which a swirl flow formation passage 30 through which steam passes is disposed in the vicinity of the drain-water inlet of the venturi nozzle 20 of the steam passage 25 according to an embodiment of the present invention illustrated in FIG. 2 so as to be at a position away from the center of the steam passage 25. FIG. 6A is a sectional view and FIG. 6B is a plan view taken along a section line II in FIG. 6A. The swirl flow formation passage 30 causes steam to generate a swirl flow or a turbulent flow, and consequently, it is possible to suppress adhesion of rust and dust that pass through the screen 16, which are factors of clogging of the bore of the venturi tube 21 disposed in the venturi nozzle 20. The swirl flow formation means is not limited to the swirl flow formation passage 30. A dimple, a screw-shaped groove, or the like may be formed in the steam passage 25 to produce a swirl flow or a turbulent flow.

INDUSTRIAL APPLICABILITY

The nozzle-type steam trap according to the present invention is a steam trap that has a mechanism in which a small-diameter tube-shaped bore provided in an orifice nozzle, a venturi nozzle, or a tunnel structure resistance nozzle is sealed by a drain water, that has extremely high piping flexibility, and that has a feature in which, for example, the nozzle-type steam trap is not clogged with rust, dust, and the like drained from a steam transport system. However, the nozzle-type steam trap according to the present invention is fundamentally a steam trap that is designed on the basis of hydraulic engineering and is thus applicable to any general gas piping systems, not limited to a steam system, in the point of view of drainage of a condensate in gas flowing pipes, without mentioning drainage of a drain water in a steam piping system, of facilities installed in any circumstances in which a boiler and the like are provided.

REFERENCE SIGNS LIST

1 Y-type strainer
2 Y-type strainer inlet
3 Y-type strainer outlet
4 Y-type strainer branch pipe
5 screen
6 drainage valve
7 steam transport pipe
8 drain-water drainage pipe
9 venturi nozzle
10 venturi tube
11 drain-water inlet passage
12 drain-water outlet passage
13 screw thread
14 steam trap body
15 strainer
16 screen
17 drainage valve
18 steam transport pipe
18-1 steam transport pipe 1
18-2 steam transport pipe 2
18-3 steam transport pipe 3
19 drain-water drainage pipe
19-1 drain-water drainage pipe 1
19-2 drain-water drainage pipe 2
19-3 drain-water drainage pipe 3
20 venturi nozzle
21 venturi tube
22 drain-water storage tank
23 cap
24 screw thread
25 steam passage
26 drain-water passage
27 intra-drain system drainage port
28 extra-drain system drainage port
29-1 three-way cock 1
29-2 three-way cock 2
29-3 three-way cock 3
29-4 three-way cock 4
30 swirl flow formation passage
I extra-drain system drainage port
II section line

The invention claimed is:

1. A nozzle-type steam trap that causes steam flowing in from a steam transport channel to flow through a venturi nozzle, an orifice nozzle, or a tunnel structure resistance nozzle and that drains a drain water from a drain-water drainage channel, the nozzle-type steam trap comprising a nozzle sealing means disposed on a drain-water drainage side of the nozzle that has a small-diameter tube-shaped bore through which the drain water is drained, the nozzle sealing means sealing the bore by using the drain water,
   wherein the nozzle sealing means is a drain-water storage portion that includes an intra-drain system drainage port connected to an extra-drain system drainage port through which the drain water is drained to an outside of a system of the nozzle-type steam trap, the extra-drain system drainage port being disposed at a portion above the intra-drain system drainage port,
   wherein the steam transport channel through which the steam flows into the nozzle-type steam trap and the drain-water drainage channel through which the drain water is drained via the extra-drain system drainage port of the nozzle-type steam trap are not on an identical axis, and
   wherein the steam transport channel includes a plurality of steam transport channels through which the steam flows into the system of the nozzle-type steam trap, the drain-water drainage channel includes a plurality of drain-water drainage channels through which the drain water is drained to the outside of the system of the nozzle-type steam trap from the extra-drain system drainage port, and a means for closing a selected one of the steam transport channels and a selected one of the drain-water drainage channels is provided.

2. The nozzle-type steam trap according to claim 1, wherein a swirl flow formation means that causes steam transported from the steam transport channel to generate a swirl flow is disposed in a vicinity of a drain-water inlet of the nozzle.

3. A nozzle-type steam trap that causes steam flowing in from a steam transport channel to flow through a venturi nozzle, an orifice nozzle, or a tunnel structure resistance nozzle and that drains a drain water from a drain-water drainage channel, the nozzle-type steam trap comprising a nozzle sealing means disposed on a drain-water drainage side of the nozzle that has a small-diameter tube-shaped bore through which the drain water is drained, the nozzle sealing means sealing the bore by using the drain water,
   wherein the nozzle sealing means is a drain-water storage portion that includes an intra-drain system drainage port connected to an extra-drain system drainage port through which the drain water is drained to an outside of a system of the nozzle-type steam trap, the extra-drain system drainage port being disposed at a portion above the intra-drain system drainage port, and
   wherein the steam transport channel includes a plurality of steam transport channels through which the steam flows into the system of the nozzle-type steam trap, the drain-water drainage channel includes a plurality of drain-water drainage channels through which the drain water is drained to the outside of the system of the nozzle-type steam trap from the extra-drain system drainage port, and a closing means configured to close a selected one of the steam transport channels and a selected one of the drain-water drainage channels is provided.

4. The nozzle-type steam trap according to claim 3, wherein the steam transport channel and the drain-water drainage channel are not on an identical axis.

5. The nozzle-type steam trap according to claim 3, wherein a swirl flow formation means that causes steam transported from the steam transport channel to generate a swirl flow is disposed in a vicinity of a drain-water inlet of the nozzle.

6. The nozzle-type steam trap according to claim 3, wherein the closing means is a three-way cock.

7. The nozzle-type steam trap according to claim 3, wherein the closing means is a valve.

8. The nozzle-type steam trap according to claim 3, wherein the closing means is a plug.

\* \* \* \* \*